United States Patent [19]

Kohan

[11] 4,410,653

[45] Oct. 18, 1983

[54] FLAME-RETARDANT POLYAMIDE BLENDS

[75] Inventor: Melvin I. Kohan, Wilmington, Del.

[73] Assignee: E. I. Du Pont de Nemours and Company, Wilmington, Del.

[21] Appl. No.: 138,587

[22] Filed: Apr. 8, 1980

[51] Int. Cl.³ .............................................. C08K 5/06
[52] U.S. Cl. ................................................. 524/371
[58] Field of Search ....... 260/37 N, 45.25 B, 45.95 G; 525/183, 184; 524/371

[56] References Cited

U.S. PATENT DOCUMENTS 4,141,880  2/1979  Nametz et al. ................... 260/37 N
4,376,182  3/1983  Richardson ......................... 524/371

*Primary Examiner*—Veronica P. Hoke

[57] ABSTRACT

Addition of a selected olefin polymer to a polyamide/-decabromodiphenyl ether molding resin reduces blooming in articles molded from the resins.

9 Claims, No Drawings

FLAME-RETARDANT POLYAMIDE BLENDS

FIELD OF THE INVENTION

This invention relates to flame-retardant polyamide resins, and more specifically to such resins that contain decabromodiphenyl ether.

BACKGROUND OF THE INVENTION

Decabromodiphenyl ether has not heretofore been widely used as a flame retardant for polyamide resins because of its tendency to cause "blooming" in articles molded from the resin. "Blooming" is caused by the migration of decabromodiphenyl ether to the surface of the article and manifests itself by a mottled appearance of the surface of the article. In addition, accumulation of the ether on the surface can cause an increase in electrical conductivity leading to failure in circuits which contain the resins in the form of an insulator.

SUMMARY OF THE INVENTION

It has now been found that when an olefin polymer is present in a polyamide/decabromodiphenyl ether molding blend, articles molded from the resulting blend have a reduced tendency to "bloom" over blends that do not contain the olefin polymer.

In addition it has been found that presence of the olefin polymer enhances the fire-retardant properties of the blend.

The composition of this invention is defined as a polyamide molding blend consisting essentially of (a) between about 40 and about 90 percent by weight of composition of a polyamide of film-forming molecular weight, (b) between about 5 and about 30 percent by weight of composition of decabromodiphenyl ether, (c) between about 1 and about 20 percent by weight of composition of an olefin polymer selected from (i) an adduct of an unsaturated carboxylic dianhydride and a hydrocarbon polymer having a saturated backbone chain and unsaturated hydrocarbon side chains, which contains between about 0.5 and 9 percent, preferably 1-4 percent, by weight of adduct, of the dianhydride, or (ii) an ionic copolymer of an α-olefin and an α,β-ethylenically unsaturated carboxylic acid in which the acid monomer content of the copolymer is between about 0.2 and 25 mol percent based on the copolymer, in which at least 10 percent of the carboxyl groups of the acid are neutralized with metal ions, or (iii) an unsubstituted polyolefin, or (iv) a copolymer of an α-olefin and at least one comonomer copolymerizable therewith, wherein the weight ratio (component c/component b) is greater than 0.20.

The composition can also contain up to 50% by weight of composition of a reinforcing or filling agent and/or up to 15% by weight of composition of a metal oxide flame-retardant synergist.

DESCRIPTION OF THE INVENTION

The polyamides useful herein are well known in the art. They are of film-forming molecular weight. The polyamide resin can be produced by condensation of equimolar amounts of a saturated organic dicarboxylic acid containing from 4–12 carbon atoms with an organic diamine containing 2–13 carbon atoms, in which the diamine can be employed, if desired, to provide an excess of amine end groups over carboxyl end groups in the polyamide. Vice versa, the diacid can be used to provide an excess of acid groups. Equally well, these polyamides may be made from acid-forming and amine-forming derivatives of said amines and acids such as esters, acid chlorides, amine salts, etc. Representative dicarboxylic acids used to make the polyamides include adipic acid, pimelic acid, suberic acid, sebacic acid, and dodecanedioic acid, while representative diamines include hexamethylenediamine and octamethylenediamine. In addition, the polyamide can also be prepared from self-condensation of an ω-aminocarboxylic acid or a lactam. Examples of polyamides include poly(hexamethylene adipamide) (66 nylon), poly(hexamethylene azelaamide) (69 nylon), poly(hexamethylene sebacamide) (610 nylon), and poly(hexamethylene dodecanoamide) (612 nylon), poly(4,4'-methylenedicyclohexylene dodecanoamide), or the polyamides produced by ring opening of lactams; i.e., polycaprolactam, (6 nylon), polylaurylactam (12 nylon), or, poly-11-aminoundecanoamide which is made from an ω-amino acid. It is also possible to use polyamide copolymers prepared by the polymerization of at least two of the amines or acids used to prepare the above polymers, as for example, a polymer made of adipic acid, isophthalic acid and hexamethylene diamine; or a copolymer of hexamethylene diamine, adipic acid and caprolactam. Blends of polyamides, such as a mixture of 66 nylon and 6 nylon are also included.

The polyamide is blended with between about 5 and 30 percent by weight of composition, preferably between about 10 and 25 percent, of decabromodiphenyl ether, and with between about 1 and about 20 percent by weight of composition, preferably between about 2 and 10 percent, of a selected polyolefin polymer.

The olefin polymer reduces the tendency of the decabromodiphenyl ether to "bloom" in articles molded from the composition. The olefin polymer can be the adduct, the ionic copolymer, unsubstituted polyolefin or an olefin copolymer.

In the adducts, the backbone is substantially saturated and the side-chains contain unsaturation which serve as the sites at which grafting takes place. These backbone-side chain polymers are generally copolymers of olefins and diolefins, such as ethylene or propylene, and a diene, such as 1,4-hexadiene, norbornadiene, dicyclopentadiene, ethylidene norbornene and butadiene or the like. A specific example is a copolymer of ethylene, propylene and 1,4-hexadiene and/or norbornadiene. An unsaturated carboxylic dianhydride or diacid is used with the polymer to form an adduct. The dianhydride or diacid can be maleic anhydride, fumaric anhydride, or the like. A preferred adduct is one in which the copolymer is a copolymer of ethylene, at least one $C_3$-$C_6$ α-olefin and at least one nonconjugated diene, preferably 1,4-hexadiene, and the dianhydride is maleic anhydride.

The ionic copolymers are copolymers of α-olefins of 1–8 carbon atoms with α,β-ethylenically unsaturated carboxylic acids of 3–8 carbon atoms. Examples of such acids include acrylic, methacrylic, itaconic, maleic, fumaric and the like. Preferably the carboxylic acid will comprise from between 0.2 to 25 mol percent, and preferably 1 to 10 percent, of the copolymer. Preferably, the α-olefin will be ethylene and the carboxylic acid comonomer will be acrylic or methacrylic acid. The carboxyl groups in the copolymer can be neutralized with metal cations, preferably at least 10 percent of the carboxyl groups, will be neutralized. Sodium or potassium are the preferred metal cations. Representative ω-olefins include ethylene, propylene, butene-1, pentene-1, etc. Examples of such monomers include acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride.

The unsubstituted polyolefin can be polyethylene (high or low density), polypropylene, and the like.

In copolymers of an α-olefin and a monomer copolymerizable therewith the α-olefin component can be ethylene, propylene, butylene and the like. The comonomer can be a vinyl acetate, alkyl acrylate or methacrylate or another olefin.

The weight ratio (component c/component b) is greater then 0.20. Below that ratio protection against blooming is not as pronounced.

The compositions may contain up to 50% by weight, preferably 5–20%, of a reinforcing or filling agent, such as glass fibers, glass beads, mica platelets, mineral fillers and the like.

The compositions may also contain flame-retardant enhancers (or synergists) such as antimony oxide, zinc borate, zinc oxide, zinc ferrite or ferric oxide. Especially useful are antimony oxide or a mixture of antimony oxide and zinc borate. The amount of the enhancers present, if employed will usually be between about 0.5–10% by weight of composition and preferably between 1.5–7%. It is also possible to add the synergist in the form of a concentrate, preferably an olefin polymer, defined hereinabove.

Colorants such as cadmium red, carbon black or $TiO_2$ may also be present in amounts up to 10% by weight of composition.

Antioxidants, heat or UV stabilizers and the like may also be added.

The composition is obtained simply by physically mixing the components. The mixture can be melt-extruded into a strand which can be cut or chopped to form molding pellets. Single screw or twin-screw extruders or other melt processing devices may be employed, preferably with a vacuum extraction zone. Cofeeding of ingredients to the hopper or melt injection of some or all components are feasible alternatives to preblending.

EXAMPLES

In the Examples, tensile strength and elongation were tested per ASTM D 638-77a in the dry as molded condition not less than one day after molding.

Flexural modulus was measured as described in ASTM D790-71 except that 3 rather than 5 specimens were tested. The dry as molded specimens were tested not less than one day after molding.

Notched Izod was measured by the procedure described in ASTM D256-73. Samples were tested dry as molded (DAM) not less than one day after molding.

In the Examples, the indicated composition was prepared by weighing the ingredients, tumbling them together to mix, and storing under dry conditions until ready for extrusion. The dry blend was then fed to the throat of an extruder whose temperature settings were adjusted depending on extruder type and resin type. For example, in a single-screw extruder the temperature settings are generally 5°–20° C. above the nylon melting point; in a twin-screw extruder they often approximate the melting point. In general, settings are adjusted to achieve as low a melt temperature as possible, consistent with production and dispersion requirements. The extruders were equipped with vacuum extraction zones. Cofeeding of ingredients to the hopper of the extruder or injection of components into the melt are feasible alternative techniques to preblending.

The melt exited the extruder through a suitable die and was water quenched before being fed to a cutter to yield granules of ordinary molding powder dimensions. If necessary, the granular product was dried prior to molding.

Molding of test specimens was carried out in a 6-oz reciprocating screw machine. For flammability testing 1/16"×½-×5" bars were exposed for 48 hours at 23° C., 50% RH as prescribed in Underwriters Laboratories Procedure 94. The UL vertical test procedure was followed, with the required two burns of five bars being carried out.

Tables 1 and 2 describe experiments covering a range of olefin polymers and concentrations, all of which contain glass fiber. Reductions in burn times of 17 to 100% are achieved by use of the olefin polymers. Reduction in blooming tendency is observed in samples covered by this invention.

TABLE 1

| Example | Nylon % | Wt % Glass Fiber | Wt % Cadmium Red 1570 | Wt % DBDPE[1] | Wt % $Sb_2O_3$ | Wt % Olefin Polymer |
|---|---|---|---|---|---|---|
| A | 66/6 (90/10 W/W) | 15.0 | 6.0 | 17.1 | 6.9 | None (0) |
| 1 | 66/6 (90/10 W/W) | 15.0 | 6.0 | 17.1 | 6.9 | Ionic[2] (8.25%) |
| B | 66/6 (90/10 W/W) | 15.0 | 6.0 | 15.8 | 6.3 | None (0) |
| 2 | 66/6 (90/10 W/W) | 15.0 | 6.0 | 15.8 | 6.3 | Ionic[2] (8.5) |
| C | 66/6 (90/10 W/W) | 25.0 | 0 | 13.4 | 5.35 | None (0) |
| 3 | 66/6 (90/10 W/W) | 25.0 | 0 | 13.4 | 5.35[8] | LDPE[3,9] (4.05) |
| 4 | 66/6 (85/15 W/W) | 25.0 | 0 | 18.0 | 2.0[10] | HDPE[6] (5.5) |
| 5 | 66/6 (85/15 W/W) | 25.0 | 0 | 18.0 | 2.0 + 3.0ZB[11] | LDPE[9] (6.0) |
| D | 66/6 (85/15 W/W) | 20.0 | 0 | 30.0 | 0 | None (0) |
| 6 | 66/6 (85/15 W/W) | 20.0 | 0 | 30.0 | 0 | LDPE (5.0) |
| E | 66/6 (85/15 W/W) | 20.0 | 0 | 20.0 | 0[7] | None (0) |
| 7 | 66/6 (85/15 W/W) | 20.0 | 0 | 20.0 | 0[7] | LDPE[3] (5.5) |
| 8 | 66/6 (85/15 W/W) | 20.0 | 0 | 20.0 | 1.5 + 5.0ZB[12] | LDPE[9] (6.0) |

| Example | Modifier % Nylon Replaced | UL 94 Vertical 1/16", 48 hr Total Burn, Sec | % Reduction in Burn Time[4] | Tendency To Bloom[5] |
|---|---|---|---|---|
| A | — | 6 | — | Yes |
| 1 | 15.0 | 5 | 17 | No |

TABLE 1-continued

| Example | | | | |
|---|---|---|---|---|
| B | — | 134 | — | Yes |
| 2 | 15.0 | 42 | 69 | No |
| C | — | 35 | — | Yes |
| 3 | 7.2 | 0 | 100 | No |
| 4 | 11.6 | 0 | — | No |
| 5 | 11.6 | 0 | — | No |
| D | — | 119 | — | Yes |
| 6 | 10 | 30 | 75 | No |
| E | — | 117 | — | Yes |
| 7 | 10 | 20 | 83 | No |
| 8 | 11.2 | 0 | — | No |

| Example | Tensile Strength (psi) | Elongation (%) | Flexural Modulus (psi) | Notched Izod Ft-lb/in |
|---|---|---|---|---|
| C | 23,400 | 2.7 | 1,238,000 | 1.7 |
| 3 | 21,510 | 2.7 | 1,214,000 | 2.0 |
| 4 | 20,580 | 2.6 | 1,209,000 | 2.03 |

Notes:
[1]DBDPE — decabromodiphenyl ether
[2]Ionic = partially neutralized ionomer of ethylene copolymer containing acid side groups, specifically an ethylene/methacrylic acid (85/5) copolymer modified with zinc
[3]LDPE = low density polyethylene, d = 0.92 gm/cc
[4][Time (unmodified) − Time (modified)] × 100/Time (unmodified)
[5]Blooming test based on visual inspection after heating 24 hours at 121° C.
[6]HDPE = high density polyethylene, d = 0.96 gm/cc
[7]5% Zinc Borate
[8]6.7% concentrate consisting of $Sb_2O_3$ and LDPE (4/1 weight ratio)
[9]includes LDPE introduced via $Sb_2O_3$ concentrate
[10]2.5% concentrate consisting of $Sb_2O_3$ and LDPE (4/1 weight ratio)
[11]2.5% concentrate consisting of $Sb_2O_3$ and LDPE (4/1 weight ratio) plus 3% zinc borate
[12]1.9% concentrate consisting of $Sb_2O_3$ and LDPE (4/1 weight ratio) plus 5.0% zinc borate

TABLE 2

| Example | Nylon Used | Wt % Glass Fiber | Wt % Cadmium Red 1570 | DBDPE[1] Wt % | $SB_2O_3$ Wt % | Wt %[2] Olefin Polymer |
|---|---|---|---|---|---|---|
| F | 612 | 15.0 | 0 | 17.3 | 7.0 | 0 |
| 9 | 612 | 15.0 | 0 | 17.3 | 7.0 | 9.1 |
| G | 612 | 15.0 | 6.0 | 18.6 | 7.4 | 0 |
| 10 | 612 | 15.0 | 6.0 | 18.6 | 7.4 | 7.95 |

| Example | Olefin Polymer Type | % Nylon Replaced | UL-94 Vertical 1/16", 48 hrs Total Burn, Sec | %[3] Reduction in Burn Time |
|---|---|---|---|---|
| F | None | — | 69 | — |
| 9 | Ionic[2] | 15.0 | 30 | 57 |
| G | None | — | 43 | — |
| 10 | Ionic[2] | 15.0 | 13 | 70 |

Notes:
[1]DBDPE = Decabromodiphenyl ether.
[2]Ionic = Partially neutralized ionomer of ethylene copolymer containing acid side groups, specifically an ethylene/methacrylic acid (85/5) copolymer modified with zinc
[3][Time (unmodified) − Time (modified)] × 100/Time (unmodified)

I claim:

1. A polyamide molding blend consisting essentially of
   (a) between about 40 and about 90 percent by weight of composition of a polyamide of film-forming molecular weight,
   (b) between about 5 and about 30 percent by weight of blend of decabromodiphenyl ether,
   (c) between about 1 and about 20 percent by weight of blend of an olefin polymer selected from
      (i) an adduct of an unsaturated carboxylic anhydride and a hydrocarbon polymer having a saturated backbone chain and unsaturated hydrocarbon side chains, which contains between about 0.5 and 9 percent, preferably 1–4 percent, by weight of adduct, of the dianhydride, or
      (ii) an ionic copolymer of an α-olefin and an α,β-ethylenically unsaturated carboxylic acid in which the acid monomer content of the copolymer is between about 0.2 and 25 mol percent based on the copolymer, in which at least 10 percent of the carboxyl groups of the acid are neutralized with metal ions, or
      (iii) an unsubstituted polyolefin, or
      (iv) a copolymer of an ω-olefin and at least one comonomer copolymerizable therewith, wherein the ratio component c/component b is greater than 0.20.

2. The polyamide blend of claim 1 which additionally contains between about 0.5–10% by weight of blend of a flame-retardant synergist.

3. The polyamide blend of claim 1 which additionally contains between about 5–50% by weight of blend of a reinforcing or filling agent.

4. The polyamide blend of claim 2 which additionally contains between about 5–50% by weight of blend of a reinforcing or filling agent.

5. The polyamide blend of claims 1, 2, 3 or 4 in which the olefin polymer is polyethylene.

6. The polyamide blend of claims 2 or 4 in which the synergist is a mixture of antimony oxide and zinc borate.

7. Process of preparing the blend of claim 1 which comprises mixing the components of the blend defined in claim 1.

8. Process of claim 7 which comprises the additional step of melting the blend and extruding it in a strand and chopping the strand into pellets.

9. Process for preparing articles which comprises melting the molding pellets of claim 8 and injecting the melt into a mold.

* * * * *